United States Patent
Tsai et al.

(10) Patent No.: US 11,677,303 B2
(45) Date of Patent: Jun. 13, 2023

(54) MOTOR AND CORELESS STATOR COIL WINDING UNIT THEREOF

(71) Applicant: NATIONAL CHENG KUNG UNIVERSITY, Tainan (TW)

(72) Inventors: Mi-Ching Tsai, Tainan (TW); Min-Fu Hsieh, Tainan (TW); Kai-Jung Shih, Tainan (TW); Po-Wei Huang, Kaohsiung (TW); Lucio Jose Fernando Caceres Vera, Tainan (TW); Shang-Hui Shen, Tainan (TW); Jung-Kun Chiu, Tainan (TW); Hsin-Yu Chiu, Tainan (TW)

(73) Assignee: National Cheng Kung University, Tainan (TW)

( * ) Notice: Subject to any disclaimer, the term of this patent is extended or adjusted under 35 U.S.C. 154(b) by 43 days.

(21) Appl. No.: 17/507,115

(22) Filed: Oct. 21, 2021

(65) Prior Publication Data

US 2023/0130551 A1    Apr. 27, 2023

(51) Int. Cl.

| | |
|---|---|
| *H02K 21/24* | (2006.01) |
| *H02K 1/2793* | (2022.01) |
| *H02K 3/47* | (2006.01) |
| *H02K 3/28* | (2006.01) |
| *H02K 1/18* | (2006.01) |

(52) U.S. Cl.
CPC ............. *H02K 21/24* (2013.01); *H02K 1/182* (2013.01); *H02K 1/2793* (2013.01); *H02K 3/28* (2013.01); *H02K 3/47* (2013.01)

(58) Field of Classification Search
CPC ........... H02K 1/18; H02K 1/182; H02K 1/27; H02K 1/2793; H02K 3/28; H02K 3/47; H02K 21/24
USPC ......................................................... 310/268
See application file for complete search history.

(56) References Cited

U.S. PATENT DOCUMENTS

| | | | | |
|---|---|---|---|---|
| 5,177,389 | A * | 1/1993 | Schalk | H02K 21/24 310/156.43 |
| 8,917,007 | B2 * | 12/2014 | Matsuzaki | F04D 13/064 310/268 |
| 2009/0072651 | A1 * | 3/2009 | Yan | H02K 15/0407 336/200 |
| 2010/0148611 | A1 * | 6/2010 | Wang | H02K 1/14 310/216.006 |
| 2010/0225112 | A1 * | 9/2010 | Hayakawa | H02K 7/083 290/43 |
| 2011/0110800 | A1 * | 5/2011 | Lai | H02K 3/47 310/156.32 |

(Continued)

*Primary Examiner* — Rashad H Johnson
(74) *Attorney, Agent, or Firm* — Rosenberg, Klein & Lee

(57) ABSTRACT

A motor and a coreless stator coil winding unit thereof are disclosed. The coreless stator coil winding unit includes an overlapping coil winding assembly and a non-overlapping coil winding assembly. The overlapping coil winding assembly includes a plurality of first coils arranged annularly and a plurality of second coils arranged annularly. The first coils and the second coils overlap with a phase difference. The non-overlapping coil winding assembly includes a plurality of third coils arranged annularly. The third coils are each located between an adjacent one of the first coils and an adjacent one of the second coils. Thus, the back electromotive force constant and torque constant of the motor have a better performance.

9 Claims, 4 Drawing Sheets

(56) References Cited

U.S. PATENT DOCUMENTS

| | | | |
|---|---|---|---|
| 2011/0133591 A1* | 6/2011 | Yan | H02K 3/47 |
| | | | 310/198 |
| 2011/0241463 A1* | 10/2011 | Iki | H02K 1/182 |
| | | | 310/71 |
| 2013/0062990 A1* | 3/2013 | Takeuchi | B62M 6/40 |
| | | | 310/216.004 |
| 2017/0155297 A1* | 6/2017 | Tokoi | H02K 21/24 |
| 2017/0179782 A1* | 6/2017 | Ito | H02K 15/066 |
| 2019/0115129 A1* | 4/2019 | Kim | H01F 5/003 |
| 2019/0273409 A1* | 9/2019 | Lee | H02K 3/04 |
| 2019/0296596 A1* | 9/2019 | Iwaya | H01B 7/00 |
| 2019/0363597 A1* | 11/2019 | Takeuchi | H02K 3/04 |
| 2020/0166041 A1* | 5/2020 | Shi | F04D 19/048 |
| 2021/0044162 A1* | 2/2021 | Maruyama | H02K 21/24 |
| 2021/0367469 A1* | 11/2021 | Yamamoto | H02K 3/12 |
| 2021/0384794 A1* | 12/2021 | Tamura | H02K 3/522 |
| 2022/0190665 A1* | 6/2022 | Lee | H02K 3/47 |
| 2022/0263393 A1* | 8/2022 | Takahashi | H02K 1/276 |
| 2022/0271596 A1* | 8/2022 | Takahashi | H02K 3/522 |
| 2022/0344983 A1* | 10/2022 | Shin | H02K 3/50 |
| 2022/0376567 A1* | 11/2022 | Takazawa | H02K 1/141 |

\* cited by examiner

MOTOR AND CORELESS STATOR COIL WINDING UNIT THEREOF

FIELD OF THE INVENTION

The present invention relates to a motor and a coreless stator coil winding unit thereof, and more particularly to a coreless stator coil winding unit composed of an overlapping coil winding assembly and a non-overlapping coil winding assembly.

BACKGROUND OF THE INVENTION

A motor is composed of a rotor and a stator. The rotor is equipped with permanent magnets. The stator is equipped with coils for introducing current, thereby generating an induced electromotive force to rotate the rotor.

Specifically, stators are generally classified into stators having iron cores and stators not having iron cores. For a stator having an iron core, the iron core provides a winding shaft for the wire to be wound on the winding shaft to form coils. For a stator not having an iron core, the wire is wound into coils connected in series to form an annular stator structure.

Coreless stators may be in the form of an overlapping coil winding assembly or in the form of a non-overlapping coil winding assembly. The coreless stator in the form of an overlapping coil winding assembly includes overlapped double-layer coils, for example, Chinese Patent Publication No. CN108242860A, titled "CORELESS STATOR AND MOTOR". The coreless stator in the form of a non-overlapping coil winding assembly only has single-layer coils, for example, Chinese Patent Publication No. CN108123558A, titled "CORELESS AXIAL FLUX MOTOR".

After calculating the back electromotive force and torque of the motor using the coreless stator in the form of an overlapping coil winding assembly and the motor using the coreless stator in the form of a non-overlapping coil winding assembly, under the same configuration, the motor using the overlapping coil winding assembly performs better than the motor using the non-overlapping coil winding assembly in back electromotive force constant and torque constant.

SUMMARY OF THE INVENTION

In order to further increase the torque of a motor, according to one aspect of the present invention, a coreless stator coil winding unit for a motor is provided. The coreless stator coil winding unit comprises an overlapping coil winding assembly and a non-overlapping coil winding assembly. The overlapping coil winding assembly includes a plurality of first coils arranged annularly and a plurality of second coils arranged annularly. The first coils and the second coils overlap with a phase difference. The non-overlapping coil winding assembly includes a plurality of third coils arranged annularly. The third coils are each located between an adjacent one of the first coils and an adjacent one of the second coils.

Preferably, the coreless stator coil winding unit further comprises a printed circuit board. The first coils and the second coils of the overlapping coil winding assembly are arranged on opposite sides of the printed circuit board, respectively.

Preferably, the first coils and the second coils of the overlapping coil winding assembly have a coil pitch less than $\pi$. Preferably, the coil pitch of the first coils and the second coils of the overlapping coil winding assembly is greater than or equal to $\frac{5}{6}\pi$.

According to another aspect of the present invention, a motor is provided. The motor comprises at least one rotor and the foregoing coreless stator coil winding unit arranged relative to the rotor.

Preferably, the at least one rotor includes two rotors respectively located on two opposite sides of the coreless stator coil winding unit.

According to the above technical features, the present invention achieves the following effects:

1. The coreless stator coil winding unit is equipped with the overlapping coil winding assembly and the non-overlapping coil winding assembly, which can improve space utilization (coil space factor). This has a better performance in the back electromotive force constant, torque constant and output power of the motor.

2. The coil pitch of the first coils and the second coils of the overlapping coil winding assembly is $\frac{5}{6}\pi$, so that the third coils of the non-overlapping coil winding assembly can be installed to obtain the optimized back electromotive force constant, torque constant and output power.

3. The printed circuit board is used to separate the first coils, the second coils, and the third coils each located between the adjacent first coil and the adjacent second coil. This prevents the first coils and the third coils located on one side of the printed circuit board from contacting the second coils and the third coils located on the other side of the printed circuit board to cause electrical breakdown.

DESCRIPTION OF THE PREFERRED EMBODIMENTS

Embodiments of the present invention will now be described, by way of example only, with reference to the accompanying drawings.

Figure 1:
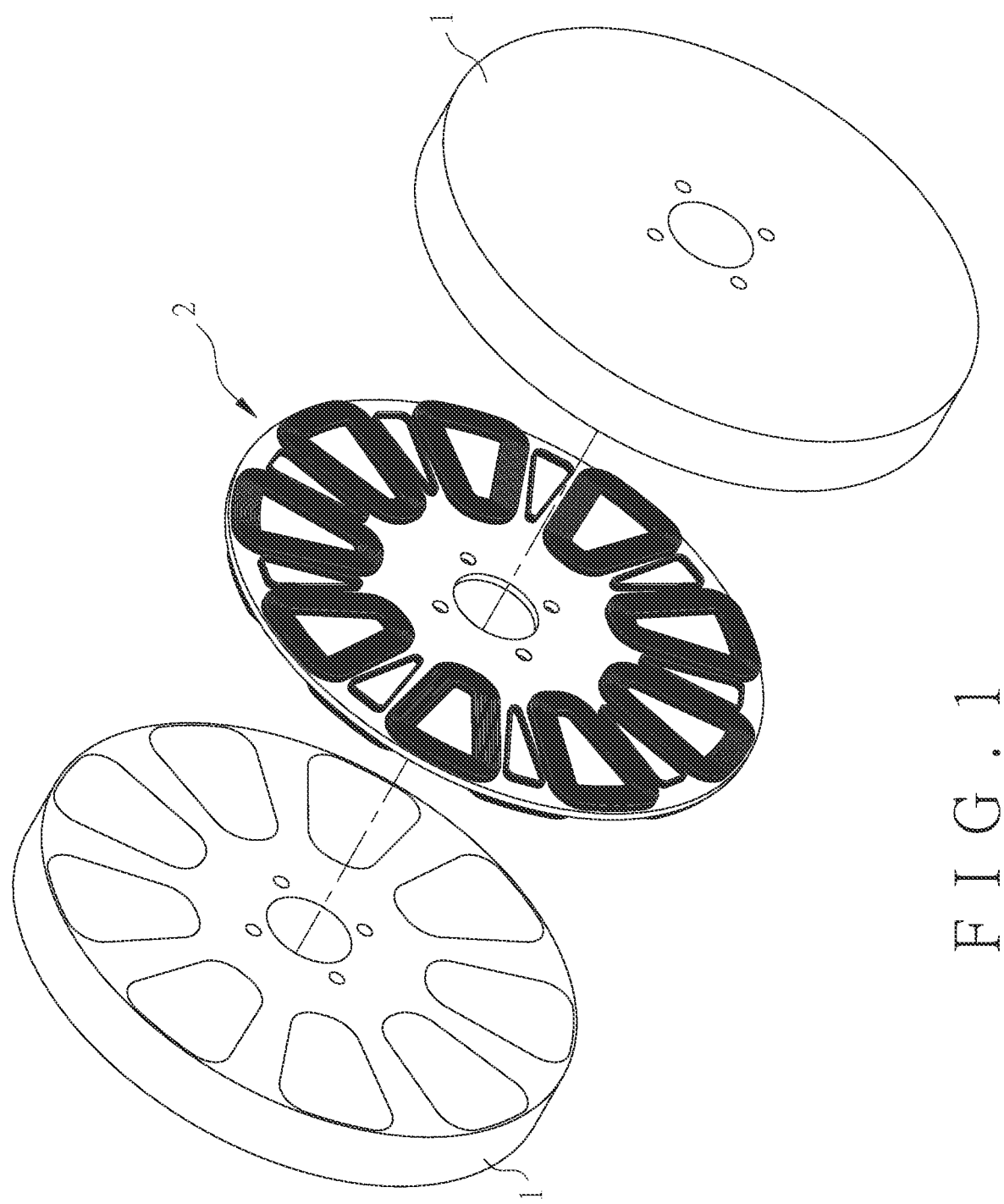
FIG. 1 is an exploded view of the motor of the present invention.
Figure 2:
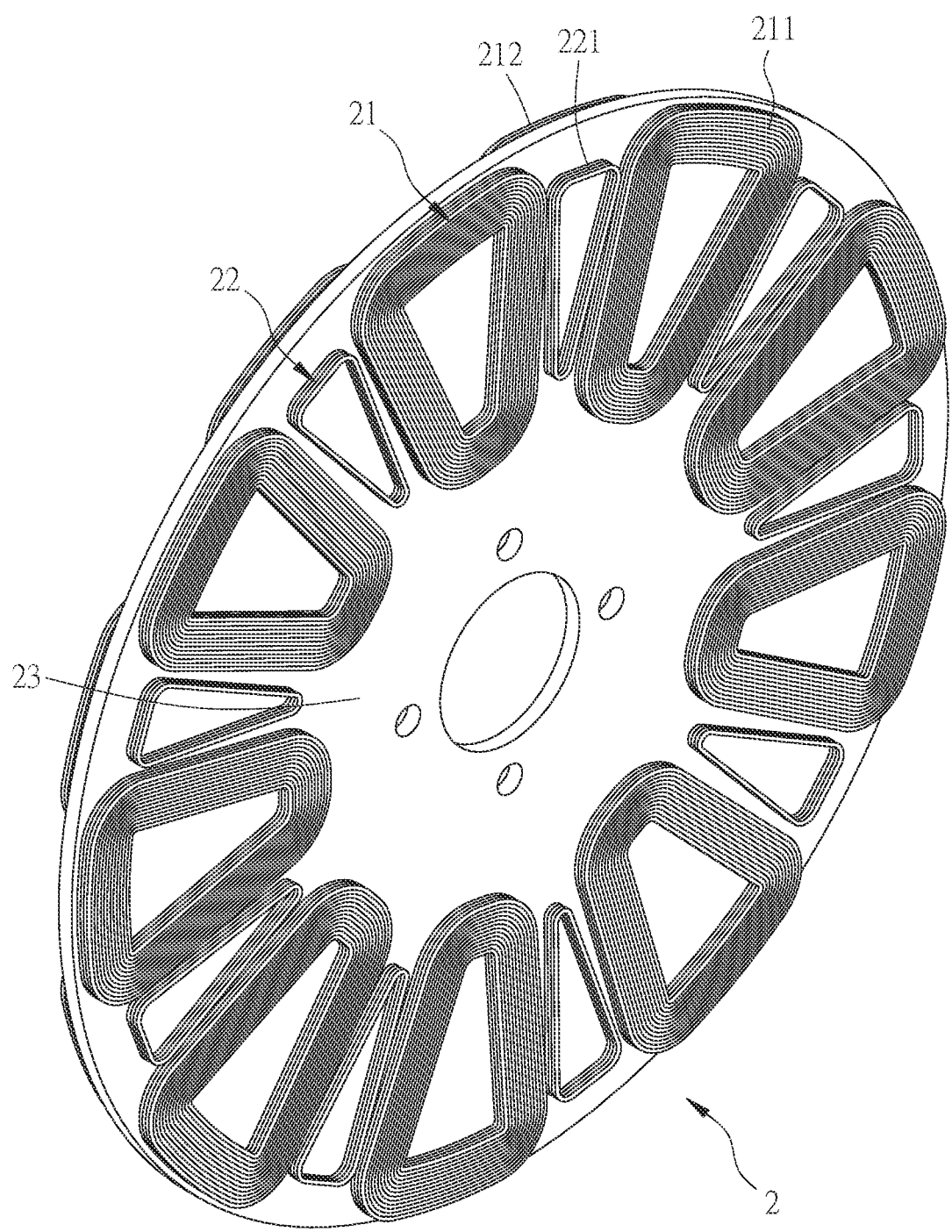
FIG. 2 is a perspective view of the coreless stator coil winding unit of the motor of the present invention.
Figure 3:
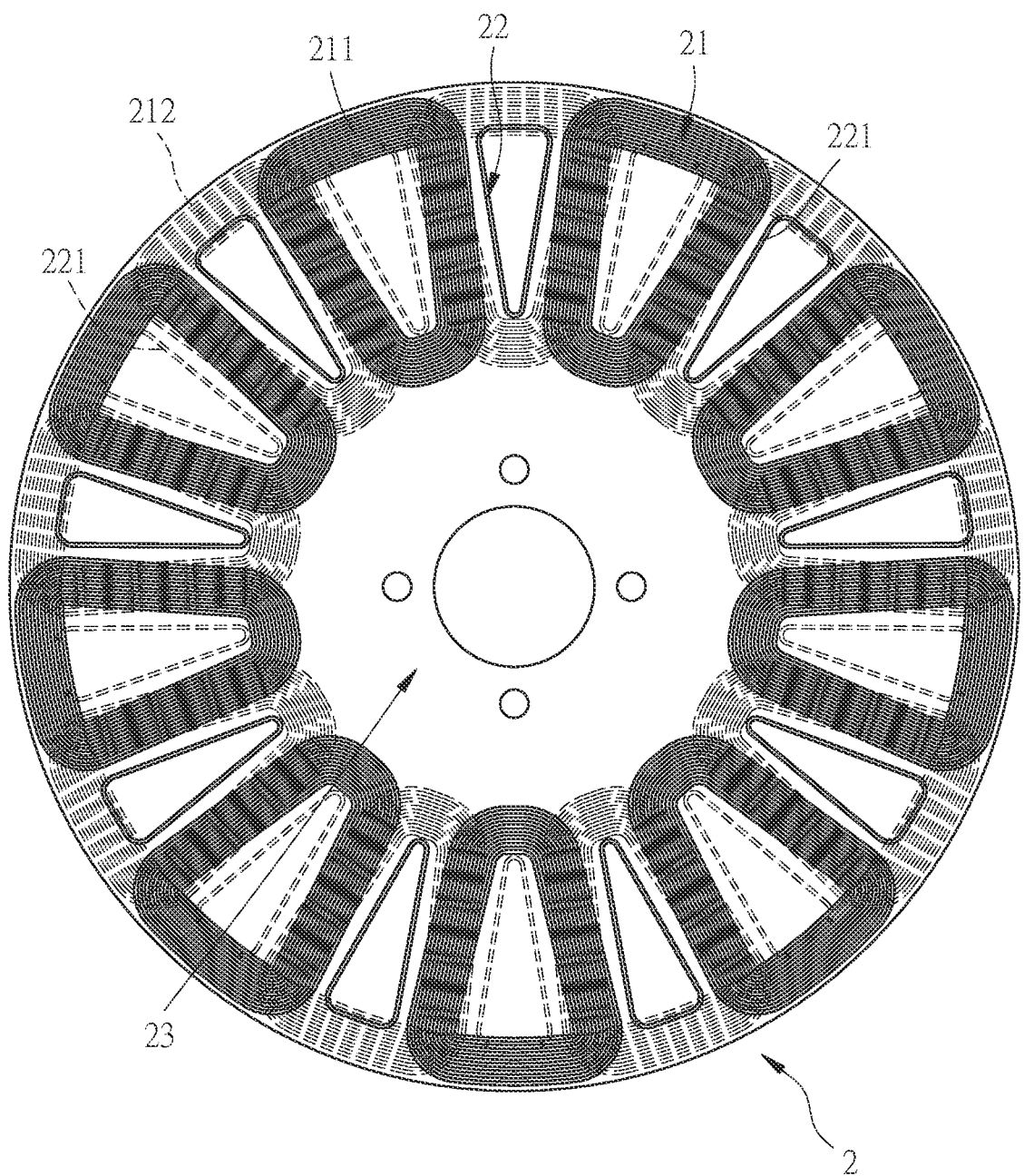
FIG. 3 is a planar view of the coreless stator coil winding unit of the motor of the present invention.
Figure 4:
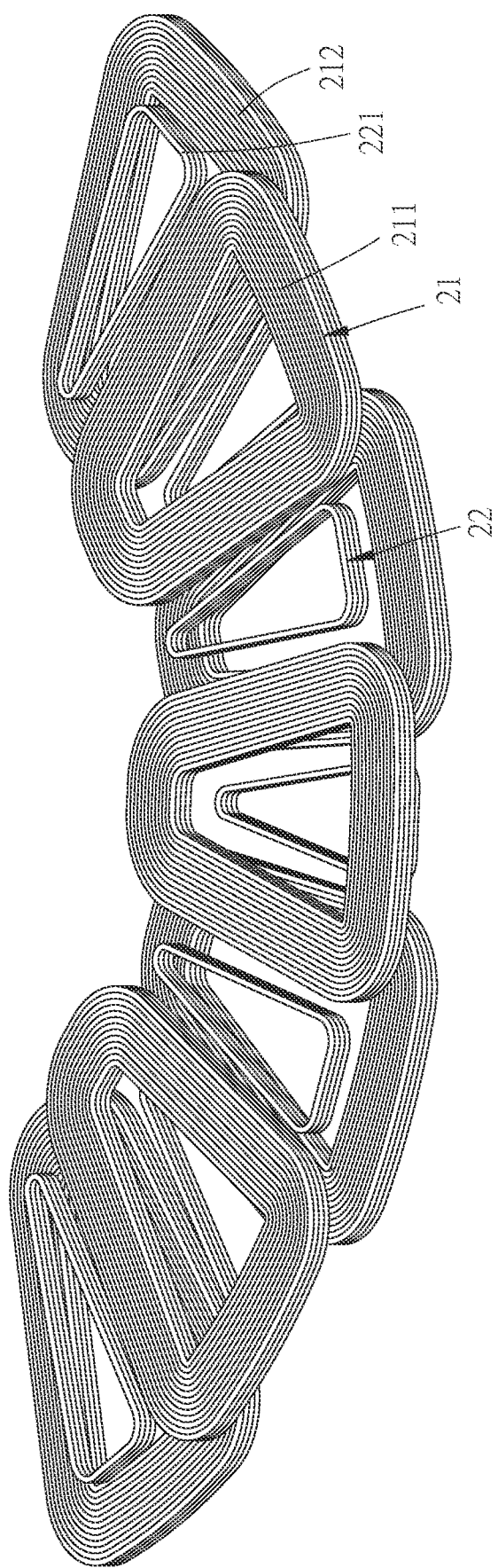
FIG. 4 is a partial view of the coreless stator coil winding unit of the motor of the present invention.

As shown in FIG. 1, a motor according to an embodiment of the present invention comprises at least one rotor 1 and a coreless stator coil winding unit 2 arranged relative to the rotor 1. Specifically, in this embodiment, the at least one rotor 1 includes two rotors respectively located on two opposite sides of the coreless stator coil winding unit 2. Referring to FIGS. 2 to 4, the coreless stator coil winding unit 2 includes an overlapping coil winding assembly 21, a non-overlapping coil winding assembly 22, and a printed circuit board 23.

The overlapping coil winding assembly 21 includes a plurality of first coils 211 arranged annularly and a plurality of second coils 212 arranged annularly. The first coils 211 and the second coils 212 overlap with a phase difference. The phase difference is, for example, 30 degrees. The coil pitch of the first coils 211 and the second coils 212 is less than $\pi$, which is preferably $\frac{5}{6}\pi$ in this embodiment. The non-overlapping coil winding assembly 22 includes a plurality of third coils 221 arranged annularly. The third coils 221 are each located between the adjacent first coil 211 and the adjacent second coil 212. The first coils 211 and the second coils 212 of the overlapping coil winding assembly 21 are arranged on opposite sides of the printed circuit board 23, respectively. This prevents the first coils 211 and the third coils 221 located on one side of the printed circuit board 23 from contacting the second coils 212 and the third coils 221 located on the other side of the printed circuit board 23 to cause electrical breakdown.

The following Table 1 and Table 2 are the simulation of the efficiency of the back electromotive force constant, torque constant and output power of an ironless stator motor using a conventional overlapping coil winding assembly.

TABLE 1

| driving voltage | back electromotive force @200 rpm | back electromotive force constant | torque constant |
|---|---|---|---|
| 36 V DCbus | 10.19 V | 0.486 | 0.6867 |

TABLE 2

| load | rotating speed | input power | output power | efficiency |
|---|---|---|---|---|
| 4 Nm | 294.2 rpm | 183.9 W | 124.8 W | 68% |
| 7 Nm | 195 rpm | 314.2 W | 141.6 W | 45% |

The following Table 3 and Table 4 are the simulation of the efficiency of the back electromotive force constant, torque constant and output power of the motor using the coreless stator coil winding unit of this embodiment.

TABLE 3

| driving voltage | back electromotive force @200 rpm | back electromotive force constant | torque constant |
|---|---|---|---|
| 36 V DCbus | 11.83 V | 0.565 | 0.758 |

TABLE 4

| load | rotating speed | input power | output power | efficiency |
|---|---|---|---|---|
| 4 Nm | 256.3 rpm | 150.68 W | 107.36 W | 71.25% |
| 7 Nm | 179.1 rpm | 262.58 W | 131.29 W | 50% |

According to the above simulation data, it can be known that the motor using the coreless stator coil winding unit 2 of the present invention has better efficiency of the back electromotive force constant, torque constant and of output power.

Although particular embodiments of the present invention have been described in detail for purposes of illustration, various modifications and enhancements may be made without departing from the spirit and scope of the present invention. Accordingly, the present invention is not to be limited except as by the appended claims.

What is claimed is:

1. A coreless stator coil winding unit for a motor, comprising:
    an overlapping coil winding assembly, including a plurality of first coils arranged annularly and a plurality of second coils arranged annularly, the first coils and the second coils overlapping with a phase difference;
    a non-overlapping coil winding assembly, including a plurality of third coils arranged annularly, the third coils being each located between an adjacent one of the first coils and an adjacent one of the second coils.

2. The coreless stator coil winding unit as claimed in claim 1, further comprising a printed circuit board, wherein the first coils and the second coils of the overlapping coil winding assembly are arranged on opposite sides of the printed circuit board, respectively.

3. The coreless stator coil winding unit as claimed in claim 1, wherein the first coils and the second coils of the overlapping coil winding assembly have a coil pitch less than $\pi$.

4. The coreless stator coil winding unit as claimed in claim 3, wherein the coil pitch of the first coils and the second coils of the overlapping coil winding assembly is greater than or equal to $5/6\ \pi$.

5. A motor, comprising:
    at least one rotor;
    a coreless stator coil winding unit, arranged relative to the rotor, the coreless stator coil winding unit including:
        an overlapping coil winding assembly, including a plurality of first coils arranged annularly and a plurality of second coils arranged annularly, the first coils and the second coils overlapping with a phase difference,
        a non-overlapping coil winding assembly, including a plurality of third coils arranged annularly, the third coils being each located between an adjacent one of the first coils and an adjacent one of the second coils.

6. The motor as claimed in claim 5, further comprising a printed circuit board, wherein the first coils and the second coils of the overlapping coil winding assembly are arranged on opposite sides of the printed circuit board, respectively.

7. The motor as claimed in claim 5, wherein the first coils and the second coils of the overlapping coil winding assembly have a coil pitch less than $\pi$.

8. The motor as claimed in claim 7, wherein the coil pitch of the first coils and the second coils of the overlapping coil winding assembly is greater than or equal to $5/6\ \pi$.

9. The motor as claimed in claim 5, wherein the at least one rotor includes two rotors respectively located on two opposite sides of the coreless stator coil winding unit.

\* \* \* \* \*